US012694718B2

(12) United States Patent
Septiana et al.

(10) Patent No.:  US 12,694,718 B2
(45) Date of Patent:       Jul. 28, 2026

(54) GENERATION METHOD AND INFORMATION PROCESSING APPARATUS

(71) Applicant: FUJITSU LIMITED, Kawasaki (JP)

(72) Inventors: Lina Septiana, Machida (JP);
Hidetsugu Uchida, Meguro (JP);
Tomoaki Matsunami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 296 days.

(21) Appl. No.: 18/405,358

(22) Filed: Jan. 5, 2024

(65) Prior Publication Data

US 2024/0144729 A1      May 2, 2024

Related U.S. Application Data

(63) Continuation of application No. PCT/JP2021/029117, filed on Aug. 5, 2021.

(51) Int. Cl.
*G06V 40/40*          (2022.01)
*G06V 10/82*          (2022.01)

(52) U.S. Cl.
CPC .............. *G06V 40/40* (2022.01); *G06V 10/82* (2022.01)

(58) Field of Classification Search
CPC ...... G06V 40/40; G06V 10/82; G06V 10/764; G06V 40/172; G06V 10/454; G06V 40/161; G06V 40/168; G06V 40/45; G06V 40/16; G06V 40/171; G06N 3/0464; G06N 3/048; G06N 3/084; G06N 3/09; G06N 3/096; G06N 3/045; G06N 3/08; G06N 3/082; G06N 3/0495; G06N 3/04; G06N 3/0895; G06N 3/0455; G06N 3/0475; G06N 3/088; G06N 3/094; G06N 3/0985; G06F 21/32; G06T 7/00; G06T 2207/20084;

(Continued)

(56) References Cited

U.S. PATENT DOCUMENTS 10,289,822 B2 *  5/2019  Chandraker ............ G06F 21/32
10,552,663 B2 *  2/2020  Smith ...................... G06N 3/08

(Continued)

FOREIGN PATENT DOCUMENTS

JP     2019-500110      1/2019
JP     2020-525947      8/2020

(Continued)

OTHER PUBLICATIONS

EESR—Extended European Search Report dated Aug. 16, 2024 for corresponding European Application No. 21952792.6 [8 pages].

(Continued)

*Primary Examiner* — Michael S Osinski
(74) *Attorney, Agent, or Firm* — Fujitsu Intellectual Property Center

(57) ABSTRACT

An information processing apparatus calculates a parameter for each of a plurality of layers included in a first neural network through machine learning using a plurality of image datasets each containing a human biometric image. The information processing apparatus generates a determination model of determining the authenticity of a human biometric image included in a received image dataset, by setting a parameter calculated for a first layer of the first neural network in the first layer included in a second neural network that includes the first layer and does not include a second layer.

8 Claims, 10 Drawing Sheets

(58) Field of Classification Search
CPC . G06T 2207/20081; G06T 2207/30201; G06T
2207/10024; G06T 2207/20021; G06T
7/0002
See application file for complete search history.

(56) References Cited

U.S. PATENT DOCUMENTS

| | | | | |
|---|---|---|---|---|
| 11,972,630 | B2 * | 4/2024 | Nasrabadi | G06V 10/772 |
| 12,106,597 | B2 * | 10/2024 | Aragon | G06V 40/1312 |
| 12,125,257 | B2 * | 10/2024 | Vanhoucke | G06V 10/454 |
| 12,175,729 | B2 * | 12/2024 | Han | G06V 10/82 |
| 2016/0078339 | A1 * | 3/2016 | Li | G06N 3/084 |
| | | | | 706/20 |
| 2016/0162782 | A1 * | 6/2016 | Park | G06N 3/082 |
| | | | | 706/17 |
| 2017/0161591 | A1 * | 6/2017 | English | G06T 7/246 |
| 2017/0351905 | A1 * | 12/2017 | Wang | G06V 40/172 |
| 2018/0025217 | A1 | 1/2018 | Chandraker et al. | |
| 2018/0060648 | A1 | 3/2018 | Yoo et al. | |
| 2018/0150681 | A1 * | 5/2018 | Wang | G06V 40/172 |
| 2018/0157899 | A1 * | 6/2018 | Xu | G06V 10/82 |
| 2018/0285629 | A1 * | 10/2018 | Son | G06V 40/171 |
| 2018/0357501 | A1 * | 12/2018 | Ma | G06V 10/764 |
| 2018/0365824 | A1 | 12/2018 | Yuh et al. | |
| 2019/0026538 | A1 * | 1/2019 | Wang | G06V 40/172 |
| 2019/0026544 | A1 * | 1/2019 | Hua | A61B 5/1128 |
| 2019/0057268 | A1 | 2/2019 | Burge et al. | |
| 2019/0197395 | A1 * | 6/2019 | Kibune | G06N 3/082 |
| 2019/0236411 | A1 * | 8/2019 | Zhu | G06V 10/82 |
| 2020/0057916 | A1 * | 2/2020 | Yamamoto | G06N 3/084 |
| 2020/0126209 | A1 * | 4/2020 | Kim | G06T 7/0002 |
| 2020/0175290 | A1 | 6/2020 | Raja et al. | |
| 2021/0089841 | A1 * | 3/2021 | Mithun | G06V 20/52 |
| 2021/0150367 | A1 * | 5/2021 | Kwak | G06N 3/047 |
| 2021/0192337 | A1 * | 6/2021 | Loh | G06N 3/082 |
| 2022/0012637 | A1 * | 1/2022 | Rezazadegan Tavakoli | |
| | | | | G06N 3/09 |
| 2022/0180568 | A1 * | 6/2022 | Cho | G06N 3/09 |
| 2022/0188577 | A1 * | 6/2022 | Chopde | G06V 10/82 |
| 2022/0222532 | A1 * | 7/2022 | Shu | G06T 5/75 |
| 2022/0284570 | A1 * | 9/2022 | Tan | G06N 3/09 |
| 2022/0292817 | A1 * | 9/2022 | Ulasen | G06N 3/082 |
| 2022/0319238 | A1 * | 10/2022 | Kim | G06N 3/0464 |
| 2022/0343163 | A1 * | 10/2022 | Takamoto | G06N 3/045 |
| 2022/0414854 | A1 * | 12/2022 | Gupta | G06N 20/00 |

| | | | | |
|---|---|---|---|---|
| 2023/0061517 | A1 * | 3/2023 | Yang | G06V 10/774 |
| 2023/0085127 | A1 * | 3/2023 | Byun | G06N 3/09 |
| | | | | 382/157 |
| 2023/0274137 | A1 * | 8/2023 | Makariou | G06N 3/096 |
| | | | | 706/25 |
| 2023/0281755 | A1 * | 9/2023 | Yang | H04N 19/166 |
| | | | | 382/100 |
| 2024/0220776 | A1 * | 7/2024 | Kingetsu | G06N 3/082 |

FOREIGN PATENT DOCUMENTS

| | | |
|---|---|---|
| JP | 2020-201243 | 12/2020 |
| WO | 2020158217 | 8/2020 |

OTHER PUBLICATIONS

Safaa El-Din Yomna et al: "Deep convolutional neural networks for face and iris presentation attack detection: survey and case study", IET Biometrics, IEEE, Michael Faraday House, Six Hills Way, Stevenage, Herts. SG1 2AY, UK, vol. 9, No. 5, Sep. 1, 2020 (Sep. 1, 2020), pp. 179-193, XP006091685, ISSN: 2047-4938, DOI: 10.1049/IET-BMT.2020.0004.

Anonymous: "Transfer learning and fine-tuning | TensorFlow Core", Jun. 24, 2021 (Jun. 24, 2021), pp. 1-21, XP093188464, Retrieved from the Internet: URL:https://web.archive.org/web/20210624091736/ https:// www.tensorflow.org/tutorials/images/transfer_learning.

EPOA—Office Action of European Patent Application No. 21952792.6 mailed on Feb. 5, 2025 [6 pages]. ** References cited in the EPOA were previously submitted in the IDS filed on Aug. 22, 2024.

JPOA—Japanese Patent Office Action dated Nov. 12, 2024 for corresponding Japanese Application No. 2023-539481 [13 pages]. ** References cited in the JPOA were previously submitted in the IDS filed on Jan. 5, 2024.

WIPO, Interntional Search Report mailed on Nov. 2, 2021 for PCT/JP2021/029117, with English-language translation.

WIPO, Written Opinion of the International Researching Authority mailed on Nov. 2, 2021 for PCT/JP2021/029117, with English-language translation.

CNOA—Chinese Patent Office Action dated Apr. 21, 2026 for corresponding Chinese Patent Application No. 202180100743.4, with English translation (19 pages). **References US2018025217A1 and WO2020158217A1 cited in the CNOA were previously submitted in the IDS filed on Aug. 22, 2024 and Jan. 5, 2024, respectively.

\* cited by examiner

TENSOR (H120 × W120 × C3)

GENERATION METHOD AND INFORMATION PROCESSING APPARATUS

CROSS-REFERENCE TO RELATED APPLICATION

This application is a continuation application of International Application PCT/JP2021/029117 filed on Aug. 5, 2021, which designated the U.S., the entire contents of which are incorporated herein by reference.

FIELD

The embodiments discussed herein relate to a generation method and an information processing apparatus.

BACKGROUND

One of personal authentication techniques is biometric authentication that determines whether an authentication target is a registered person, on the basis of biometric information such as face, fingerprints, veins, or iris. One of security attacks on biometric authentication systems is a presentation attack.

A presentation attack is an attack in which an impostor impersonates a registered person by preparing an artificial replica of biometric information of the registered person and presenting the artificial replica to a sensor. For example, the impostor obtains a biometric image of the registered person using a portable imaging device such as a smartphone, and then places a display device displaying the biometric image on the image sensor. With advancement of imaging elements and display devices, a task of detecting presentation attacks becomes more difficult.

To deal with this, efforts are made to generate a model with high detection accuracy through machine learning. For example, there has been proposed an anomaly detection system that extracts features from training image data, generates a model for detecting presentation attacks on the basis of the extracted features, and detects presentation attacks with the generated model.

U.S. Patent Application Publication No. 2019/0057268

SUMMARY

According to one aspect, there is provided a generation method including: calculating, by a processor, a parameter for each of a plurality of layers included in a first neural network through first machine learning using a plurality of image datasets each containing a human biometric image, the plurality of layers including a first layer and a second layer; and generating, by the processor, a determination model of determining authenticity of a human biometric image included in a received image dataset, by setting a parameter calculated for the first layer of the first neural network in the first layer included in a second neural network that includes the first layer and does not include the second layer.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Conventional techniques for improving detection accuracy with machine learning, however, may generate complex models such as multilayer neural networks with a large number of layers. A complex model may need a high computational cost to determine whether an input is an attack and thus may take a long execution time.

Embodiments will be described with reference to drawings.

First Embodiment

A first embodiment will be described.

Figure 1:
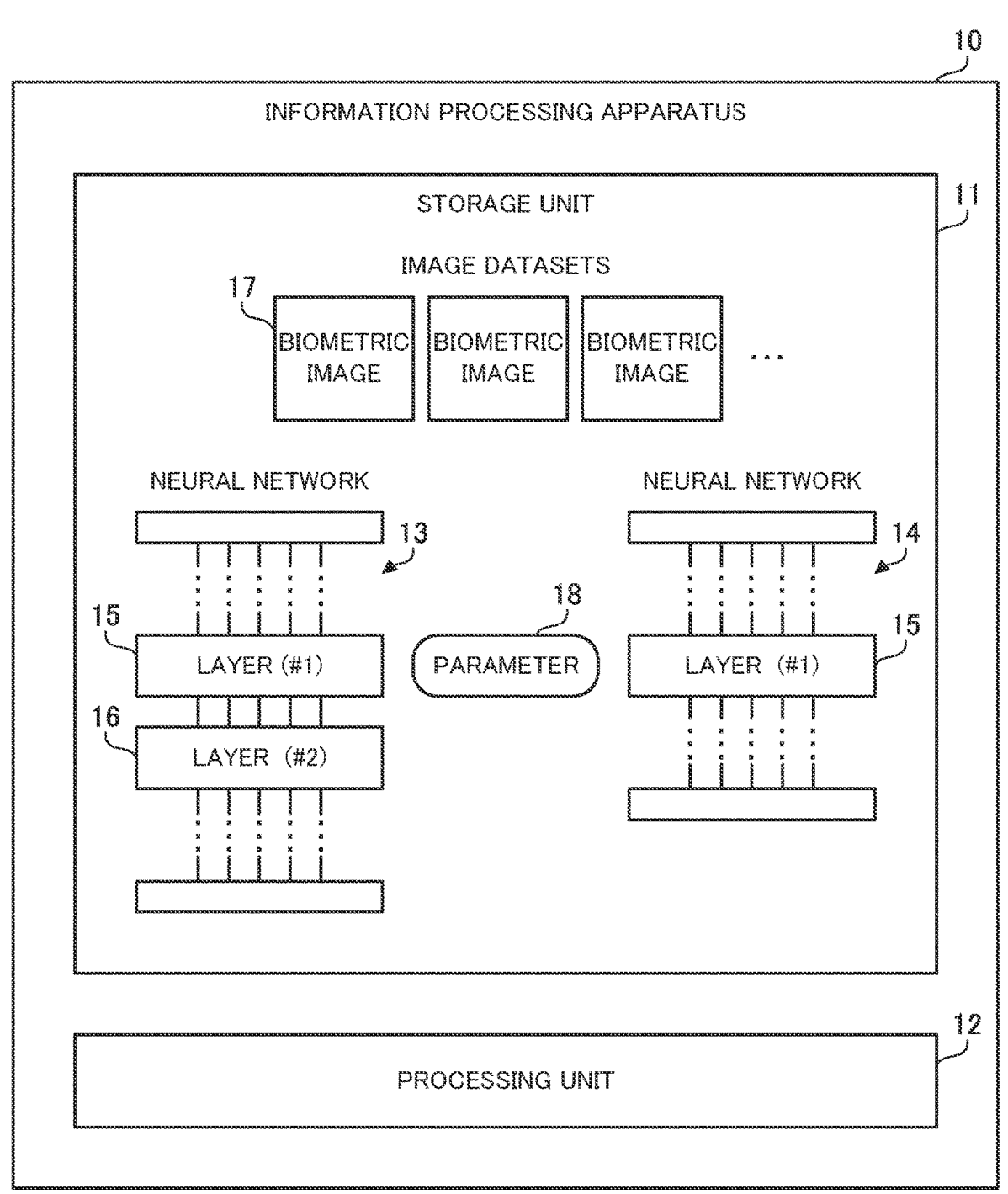
FIG. 1 is a view for describing an information processing apparatus according to a first embodiment.

FIG. 1 is a view for describing an information processing apparatus according to the first embodiment.

An information processing apparatus 10 of the first embodiment generates, through machine learning, a determination model that is used to detect presentation attacks on a biometric authentication system. The information processing apparatus 10 may detect presentation attacks using the generated determination model. The information processing apparatus 10 may be a client apparatus or a server apparatus. The information processing apparatus 10 may be called a computer, a machine learning apparatus, or a generation apparatus.

The information processing apparatus 10 includes a storage unit 11 and a processing unit 12. The storage unit 11 may be a volatile semiconductor memory, such as a random-access memory (RAM), or a non-volatile storage device, such as a hard disk drive (HDD) or a flash memory. The processing unit 12 is a processor such as a central processing unit (CPU), a graphics processing unit (GPU), or a digital signal processor (DSP), for example. In this connection, the processing unit 12 may include an application specific integrated circuit (ASIC), a field programmable gate array (FPGA), or another application specific electronic circuit. Such a processor executes programs stored in a memory such as RAM (which may be the storage unit 11). A set of processors may be called a multiprocessor, or simply "a processor."

The storage unit 11 stores a plurality of image datasets including an image dataset 17. The plurality of image datasets each contain a human biometric image. Biometric images are images of authentication targets that are captured by an image sensor at the time of biometric authentication.

Examples of the biometric images include face images that are used for face authentication, fingerprint images that are used for fingerprint authentication, and others.

In this connection, the plurality of image datasets may include a fraudulent image dataset generated by placing a counterfeit, not biometrics of an authentication target, over the image sensor. That is to say, the plurality of image datasets may include an image dataset that corresponds to a presentation attack, where an impostor impersonates a registered person. For example, the impostor captures an image of biometrics of the registered person using a portable imaging device such as a smart phone, and then displays the captured image using a display device and places the image on the image sensor. The plurality of image datasets may be each given a teacher label indicating whether a dataset is genuine or not.

The processing unit 12 generates a determination model through machine learning using the above-described image datasets. First, the processing unit 12 generates a neural network 13. The neural network 13 is a multilayer neural network including layers 15 and 16. The neural network 13 includes a plurality of nodes and a plurality of edges connecting between the plurality of nodes. Each edge has, as a parameter, a weight whose value is calculated through the machine learning.

The processing unit 12 calculates the parameters for each of the plurality of layers included in the neural network 13. The processing unit 12 may calculate the parameters with an error backpropagation method. For example, the processing unit 12 inputs an image dataset to the neural network 13 and calculates an error between the output of the neural network 13 and the teacher label. The processing unit 12 propagates error information from the output layer back to the earlier layers of the neural network 13, in order to calculate the gradient of the error with respect to the weight of each edge and update the weight on the basis of the gradient.

The neural network 13 may be a convolutional neural network (CNN), which performs a convolution operation on an input image dataset. For example, the convolution operation repeats a multiply-add operation while sliding a matrix called a kernel over a biometric image. The coefficients included in the kernel correspond to the aforementioned parameters.

For example, the neural network 13 is generated so as to determine whether an image dataset input thereto is genuine or a presentation attack. The neural network 13 may be configured to output either "1" indicating an attack class or "2" indicating a genuine class. In addition, an image dataset that is input to the neural network 13 may be a dataset containing, in chronological order, a plurality of frames obtained by imaging the same object at different time moments. An input to the neural network 13 may be called a tensor. A convolutional neural network that receives input datasets with a time axis may be called a three-dimensional convolutional neural network.

The processing unit 12 generates a neural network 14 on the basis of the neural network 13. A method of generating the neural network 14 from the neural network 13 may be called transfer learning. The neural network 14 may be a convolutional neural network. The neural network 14 may be generated so as to determine whether an image dataset input thereto is genuine or a presentation attack. In addition, the neural network 14 may be a three-dimensional convolutional neural network.

Among the plurality of layers included in the neural network 13, the neural network 14 includes the layer 15 and does not include the layer 16. The neural network 14 may include fewer layers than the neural network 13 and may be formed of a subset of layers from the neural network 13. The processing unit 12 sets a parameter 18 calculated for the layer 15 of the neural network 13, in the layer 15 of the neural network 14. By doing so, the processing unit 12 generates a determination model of determining the authenticity of a human biometric image included in a received image dataset.

The neural network 14 may be the determination model. Alternatively, the processing unit 12 may set the parameter 18 calculated for the neural network 13 as an initial value of the neural network 14, and may further perform machine learning to train the neural network 14 using a plurality of image datasets. Thus updated neural network 14 may be used as the determination model of determining the authenticity of a biometric image.

In the neural network 13, the layer 15 may be placed before the layer 16. In addition, the neural network 13 may include a first layer group (first layers), a middle layer group (middle layers), and a last layer group (last layers), each group including a plurality of layers. The middle layer group is placed after the first layer group, and the last layer group is placed after the middle layer group.

In this case, for example, the layer 15 belongs to the middle layer group, and the layer 16 belongs to the last layer group. The neural network 14 may include all layers belonging to the middle layer group and does not need to include any of the layers belonging to the last layer group. In addition, the neural network 14 may include at least one of the layers belonging to the first layer group.

Note that the processing unit 12 may divide a video captured by the image sensor into sets of a predetermined number of frames each, thereby generating a plurality of image datasets each containing a plurality of consecutive frames (for example, three consecutive frames). The processing unit 12 may use the plurality of image datasets generated from the same video as training data for calculating the parameter 18. In addition, the processing unit 12 may extract a predetermined number of frames from the beginning of a video captured by the image sensor, thereby generating one image dataset. The processing unit 12 may use this image dataset in a test of evaluating the determination accuracy of the neural network 14, or may use the image dataset in operating a biometric authentication system.

As described above, the information processing apparatus 10 of the first embodiment generates, through machine learning, a determination model of determining the presence or absence of a presentation attack from a received image dataset. With advancement of imaging devices and display devices, a task of detecting presentation attacks becomes more difficult. In this regard, the use of the generated determination model makes it possible to improve the determination accuracy and thus enhance the security of the biometric authentication system.

In addition, the information processing apparatus 10 calculates parameters for each of the plurality of layers included in the neural network 13 through the machine learning, and generates the neural network 14 that inherits the parameters of at least one of the layers, thereby generating the determination model. By doing so, the information processing apparatus 10 is able to reduce the size of the determination model and thus reduce the computational cost to determine the presence or absence of a presentation attack. Furthermore, the neural network 14 inherits the roles of at least one of the layers included in the neural network 13. Therefore, as compared with the case of generating a determination model with a few layers from the beginning, the neural network 14 is able to benefit from the advantage of multilayer structure, which is that a determination model with a large number of layers (a deep model) easily extracts essential features from an image dataset. This prevents a decrease in the accuracy of the determination model.

For example, the parameters for the first layer group in the neural network 13 may be calculated so as to contain basic pattern information for extracting basic features from an image dataset. The parameters for the middle layer group in the neural network 13 may be calculated so as to contain essential pattern information for extracting essential features from the basic features. The parameters for the last layer group in the neural network 13 may be calculated so as to contain abstract pattern information for further abstracting the essential features. Note that the parameters for the last layer group are susceptible to the influence of training data used in the machine learning.

To deal with this, the neural network 14 is generated such as to inherit the parameters of some layers and not to inherit the parameters of the subsequent layers, in order to prevent the decrease in the accuracy of the determination model. The neural network 14 does not include the last layer group, which reduces dependency on the training data and improves the determination accuracy. Moreover, the neural network 14 includes the middle layer group so as to inherit the highly versatile essential pattern information learned using the multilayer structure, which improves the determination accuracy. Furthermore, the neural network 14 does not include at least one layer of the first layer group, which further reduces the computational cost.

After the neural network 14 inherits the parameters from the neural network 13, the parameters in the neural network 14 are further updated in the transfer learning, which improves the determination accuracy of the determination model. The improvement in the accuracy of the determination model reduces the risk of erroneously identifying a biometric image corresponding to a presentation attack as genuine or the risk of erroneously identifying a genuine biometric image as a presentation attack.

In addition, the use of input datasets each containing a plurality of frames in chronological order enables the determination model to detect presentation attacks with high accuracy, taking into account temporal changes such as natural movements, changes in reflected light, environmental changes, and others. Moreover, the use of a plurality of image datasets obtained by dividing the same video as the training data ensures a sufficient amount of diverse training data. Furthermore, the use of an image dataset extracted from the beginning of a video as test data makes it possible to appropriately evaluate the accuracy of the determination model, simulating the actual operation of the biometric authentication.

Second Embodiment

A second embodiment will now be described.

An information processing apparatus 100 of the second embodiment generates, through machine learning, a determination model of detecting presentation attacks on a biometric authentication system. Biometric authentication of the second embodiment is face authentication to authenticate a user on the basis of his/her face image. The determination model of the second embodiment is a three-dimensional convolutional neural network (3D CNN) of classifying a face image based on a plurality of consecutive frames as an attack class or a genuine class.

The determination model of the second embodiment may be incorporated in a biometric information registration apparatus. For example, if the determination model detects a presentation attack on the basis of a face image during registration, the biometric information registration apparatus rejects the registration of the biometric information. Alternatively, the determination model of the second embodiment may be incorporated in a biometric authentication apparatus. For example, if the determination model detects a presentation attack on the basis of a face image during authentication, the biometric authentication apparatus determines that the authentication has failed, irrespective of the degree of similarity between the registered face image and the face image captured for the authentication. The biometric authentication system may give a warning indicating the detection of the presentation attack to a system administrator, or may store a warning message. The biometric authentication system of the second embodiment may be used for integrated circuit (IC) authentication, access control, cashless payment, system login, and others.

The information processing apparatus 100 may conduct a test of evaluating the accuracy of the generated determination model. The information processing apparatus 100 may also perform biometric information registration or biometric authentication using the determination model. Alternatively, another information processing apparatus may be used to test the determination model and to perform the biometric information registration and the biometric authentication. The information processing apparatus 100 may be a client apparatus or a server apparatus. The information processing apparatus 100 may be called a computer, a machine learning apparatus, or a biometric authentication apparatus. The information processing apparatus 100 corresponds to the information processing apparatus 10 of the first embodiment.

Figure 2:
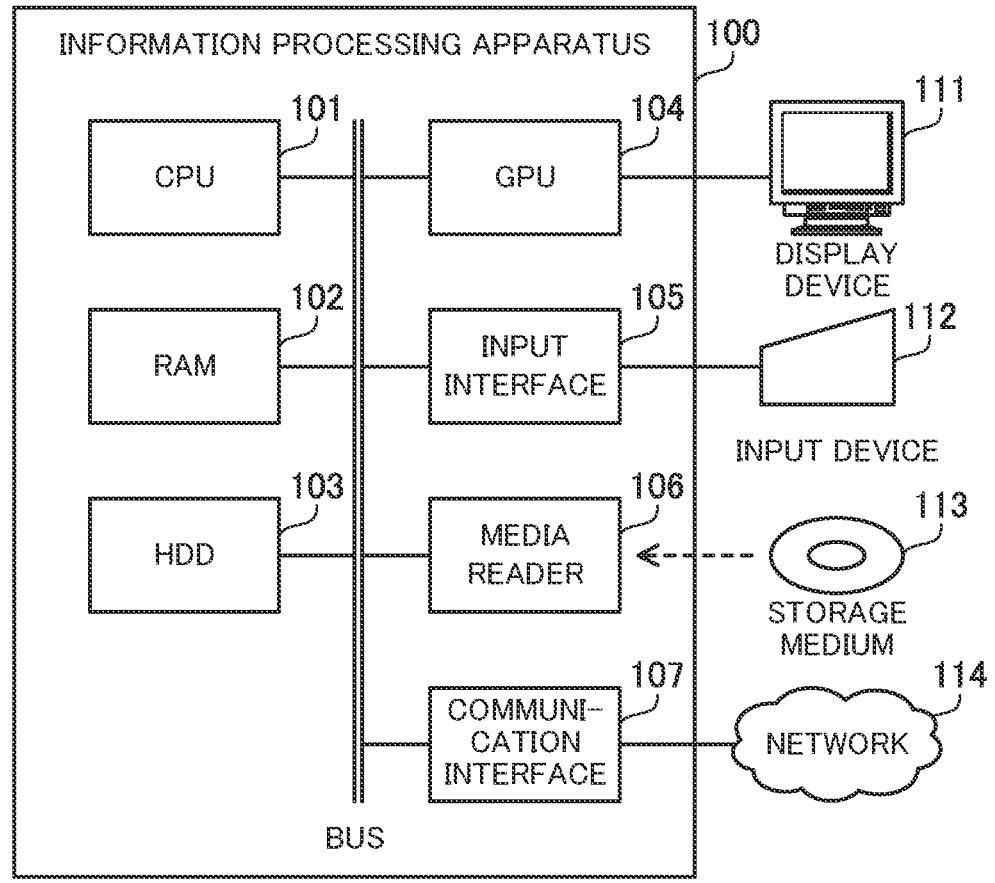
FIG. 2 is a block diagram illustrating an example of hardware configuration of the information processing apparatus.

FIG. 2 is a block diagram illustrating an example of hardware configuration of an information processing apparatus.

The information processing apparatus 100 includes a CPU 101, a RAM 102, an HDD 103, a GPU 104, an input interface 105, a media reader 106, and a communication interface 107, which are connected to a bus. The CPU 101 corresponds to the processing unit 12 of the first embodiment. The RAM 102 or HDD 103 corresponds to the storage unit 11 of the first embodiment.

The CPU 101 is a processor that executes program instructions. The CPU 101 loads at least part of a program and data from the HDD 103 to the RAM 102 and executes the program. The information processing apparatus 100 may be provided with a plurality of processors. A set of processors may be called a multiprocessor, or simply "a processor."

The RAM 102 is a volatile semiconductor memory that temporarily stores therein programs that are executed by the CPU 101 and data that is used by the CPU 101 in processing. The information processing apparatus 100 may be provided with a different type of volatile memory than RAM.

The HDD 103 is a non-volatile storage device that stores therein software programs such as operating system (OS), middleware, and application software, and data. The information processing apparatus 100 may be provided with a different type of non-volatile storage device such as a flash memory or a solid state drive (SSD).

The GPU 104 collaborates with the CPU 101 to generate and output images to a display device 111 connected to the information processing apparatus 100. For example, the display device 111 is a cathode ray tube (CRT) display, a liquid crystal display, an organic electro-luminescence (EL)

display, or a projector. Another type of output device such as a printer may be connected to the information processing apparatus 100.

The input interface 105 receives input signals from an input device 112 connected to the information processing apparatus 100. The input device 112 may be a mouse, a touch panel, or a keyboard. Alternatively, the input device 112 may be an image sensor that captures face images. At least either face images that are used as training data or face images that are used as test data, which will be described later, may be captured by the input device 112. A plurality of input devices may be connected to the information processing apparatus 100.

The media reader 106 is a reading device that reads programs and data from a storage medium 113. For example, the storage medium 113 is a magnetic disk, an optical disc, or a semiconductor memory. Magnetic disks include flexible disks (FDs) and HDDs. Optical discs include compact discs (CDs) and digital versatile discs (DVDs). The media reader 106 copies a program and data read from the storage medium 113 to another storage medium such as the RAM 102 or HDD 103. The read program may be executed by the CPU 101.

The storage medium 113 may be a portable storage medium. The storage medium 113 may be used for distribution of programs and data. In addition, the storage medium 113 and HDD 103 may be called computer-readable storage media.

The communication interface 107 is connected to a network 114 and communicates with other information processing apparatuses over the network 114. The communication interface 107 may be a wired communication interface that is connected to a wired communication device such as a switch or a router or may be a wireless communication interface that is connected to a wireless communication device such as a base station or an access point.

Figure 3:
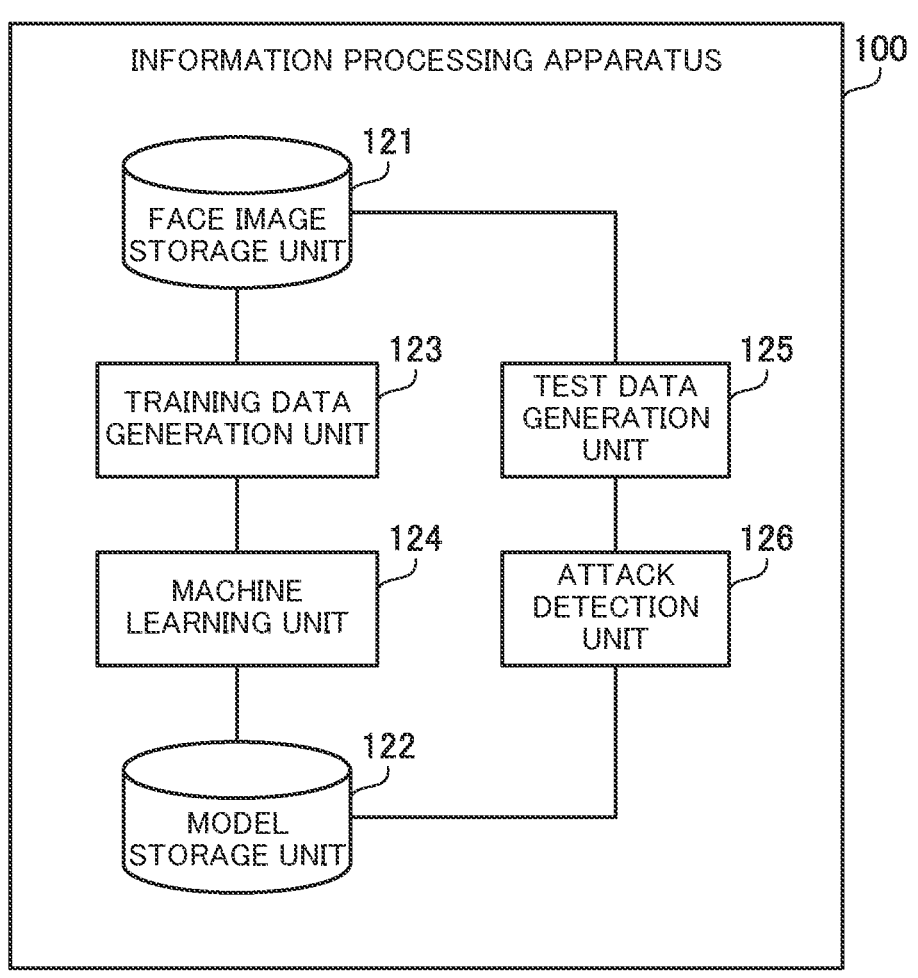
FIG. 3 is a block diagram illustrating an example of software configuration of the information processing apparatus.

FIG. 3 is a block diagram illustrating an example of software configuration of the information processing apparatus.

The information processing apparatus 100 includes a face image storage unit 121 and a model storage unit 122. These storage units are implemented by using the RAM 102 or HDD 103, for example. In addition, the information processing apparatus 100 includes a training data generation unit 123, a machine learning unit 124, a test data generation unit 125, and an attack detection unit 126. These processing units are implemented by using the CPU 101 or GPU 104, and programs, for example.

The face image storage unit 121 stores a plurality of videos. Each video is a face video of a human face and contains a plurality of frames arranged in chronological order. For example, the videos have a frame rate of 30 frames per second (fps), 60 fps, or another.

In this connection, the plurality of videos include genuine videos and fraudulent videos. The genuine videos are each captured by an image sensor for biometric authentication directly capturing a human face. The fraudulent videos are each obtained by causing the image sensor for biometric authentication to capture a face image previously captured by a portable imaging device such as a smart phone. The fraudulent videos are presentation attacks. The plurality of videos are each given a teacher label. A teacher label is "1" indicating an attack class or "2" indicating a genuine class.

The model storage unit 122 stores the determination model generated by the information processing apparatus 100. As described earlier, the determination model of the second embodiment is a three-dimensional convolutional neural network. The determination model receives, as an input dataset, a tensor (H120×W120×C3) of three frames with a size of 120 pixels in height and 120 pixels in width.

The determination model performs a convolution operation on a tensor input thereto, and outputs "1" indicating an attack class or "2" indicating a genuine class as a class to which the input tensor belongs. The convolution operation performs a multiply-add operation while sliding a matrix called a kernel over a tensor, to thereby generate another tensor called a feature map. The coefficients included in the kernel correspond to the weights of edges between the nodes included in a multilayer neural network, and are parameters optimized by machine learning. The determination model is a multilayer neural network and performs the convolution operation a plurality of times through a plurality of layers.

The training data generation unit 123 selects one or more videos to be used for training data from the face image storage unit 121 and generates training data. The training data includes a plurality of records each being a combination of an input dataset and a teacher label. The input dataset is a tensor to be input to the determination model. The teacher label is a correct answer for an output of the determination model. The training data generation unit 123 divides a video containing frames in chronological order into sets of three frames each to thereby generate input datasets, and assigns the teacher label given to the video to the input datasets.

The machine learning unit 124 optimizes the parameters of the determination model using the training data generated by the training data generation unit 123. The machine learning unit 124 may optimize the parameters with an error backpropagation method. For example, the machine learning unit 124 selects one or a few records from the training data, inputs a tensor to the determination model, and calculates an error between the output of the determination model and the teacher label. The machine learning unit 124 then propagates the error information from the output layer back to the earlier layers of the determination model, in order to calculate the gradient of the error with respect to the weight of each edge and update the weight on the basis of the gradient. The machine learning unit 124 repeats the updating of the weights of the edges while selecting a different record from the training data, thereby optimizing the weights.

As will be described later, the machine learning unit 124 generates the determination model with transfer learning. The machine learning unit 124 generates a three-dimensional convolutional neural network, and using parameters optimized for this three-dimensional convolutional neural network, generates another three-dimensional convolutional neural network as the determination model. The latter three-dimensional convolutional neural network is a compact determination model with fewer layers than the former three-dimensional convolutional neural network.

The test data generation unit 125 selects one or more videos to be used for test data from the face image storage unit 121 and generates test data. As with the training data, the test data includes records each being a combination of an input dataset and a teacher label. The input dataset is a tensor to be input to the determination model. The teacher label is a correct answer for an output of the determination model. In this connection, the test data generation unit 125 extracts the first three frames from the beginning of the selected video and uses them as an input dataset. The remaining frames other than the first three frames are not used as the test data.

The attack detection unit 126 retrieves the determination model from the model storage unit 122. The attack detection unit 126 evaluates the accuracy of the determination model using the test data generated by the test data generation unit 125. The attack detection unit 126 inputs an input dataset included in the test data to the determination model and calculates an error between the output of the determination model and the teacher label included in the test data. The attack detection unit 126 may store the accuracy of the determination model in a non-volatile storage device, may display it on the display device 111, or may send it to another information processing apparatus.

In this connection, in the actual biometric authentication, the biometric authentication system generates an input data-set from a video captured by the image sensor, in the same manner as the test data generation unit 125 does, and determines a class to which the input dataset belongs, in the same manner as the attack detection unit 126 does. The test data generation unit 125 and attack detection unit 126 may be implemented in another information processing apparatus.

The following describes the structure of the determination model.

Figure 4:
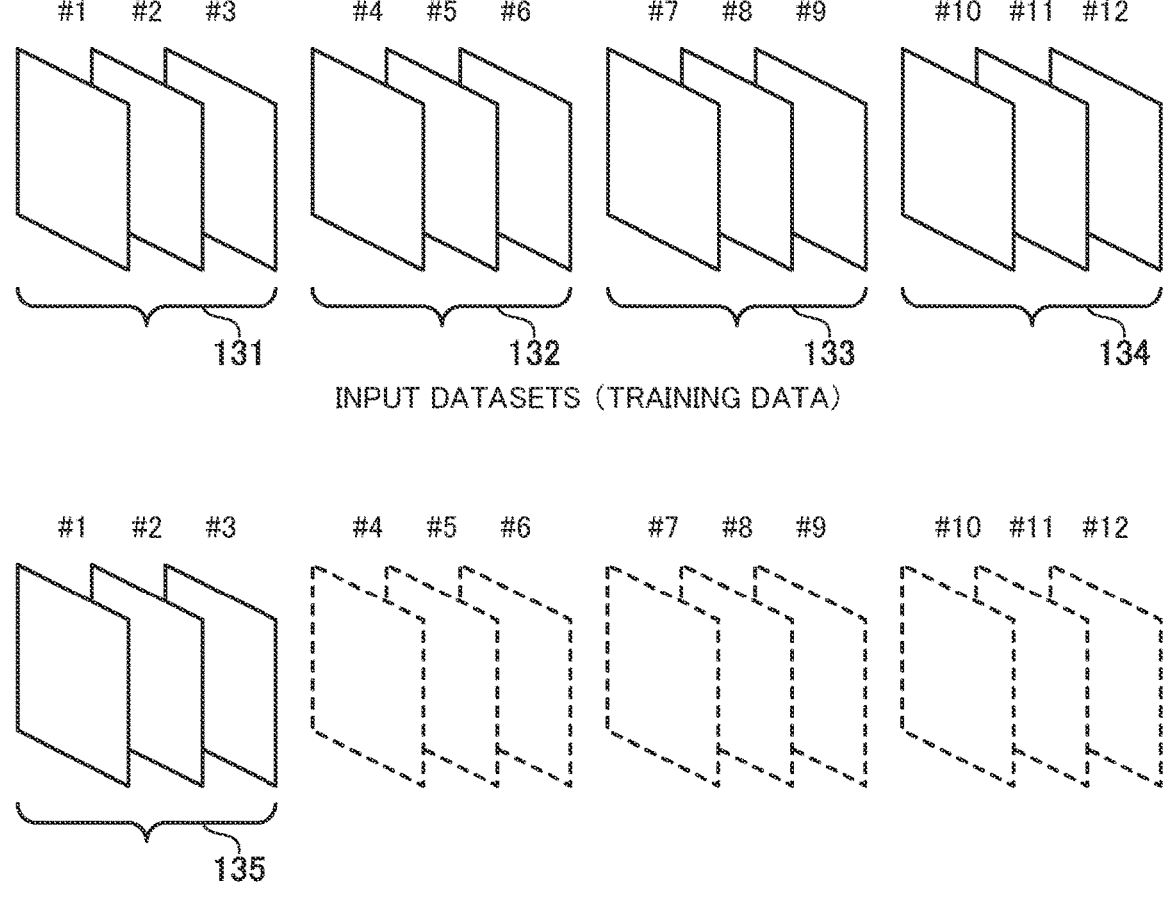
FIG. 4 illustrates an example of how to generate input datasets for training data and an input dataset for test data.

FIG. 4 illustrates an example of how to generate input datasets for training data and an input dataset for test data.

As described earlier, the training data generation unit 123 divides a video containing a plurality of frames to generate input datasets of three frames each. The training data generation unit 123 generates an input dataset 131 containing frames #1, #2, and #3, an input dataset 132 containing frames #4, #5, and #6, an input dataset 133 containing frames #7, #8, and #9, and an input dataset 134 containing frames #10, #11, and #12. The input datasets 131, 132, 133, and 134 form tensors that are included in different records in the training data.

On the other hand, the test data generation unit 125 extracts the first three frames from a video containing a plurality of frames to thereby generate an input dataset. Usually, a video for training data and a video for test data are different videos. The test data generation unit 125 generates an input dataset 135 containing frames #1, #2, and #3. The input dataset 135 forms a tensor that is included in one record in the test data.

In generating the input datasets 131, 132, 133, and 134, the training data generation unit 123 normalizes the video. The training data generation unit 123 detects a human face from the video with image recognition and extracts a rect-angular region surrounding the detected face. The training data generation unit 123 then resizes the extracted rectan-gular region to an input size of the determination model. For example, the training data generation unit 123 resizes the extracted rectangular region to 120×120. In addition, the training data generation unit 123 normalizes the distribution of pixel values by correcting each pixel value. In addition, in generating the input dataset 135, the test data generation unit 125 performs normalization in the same manner.

Figure 5:
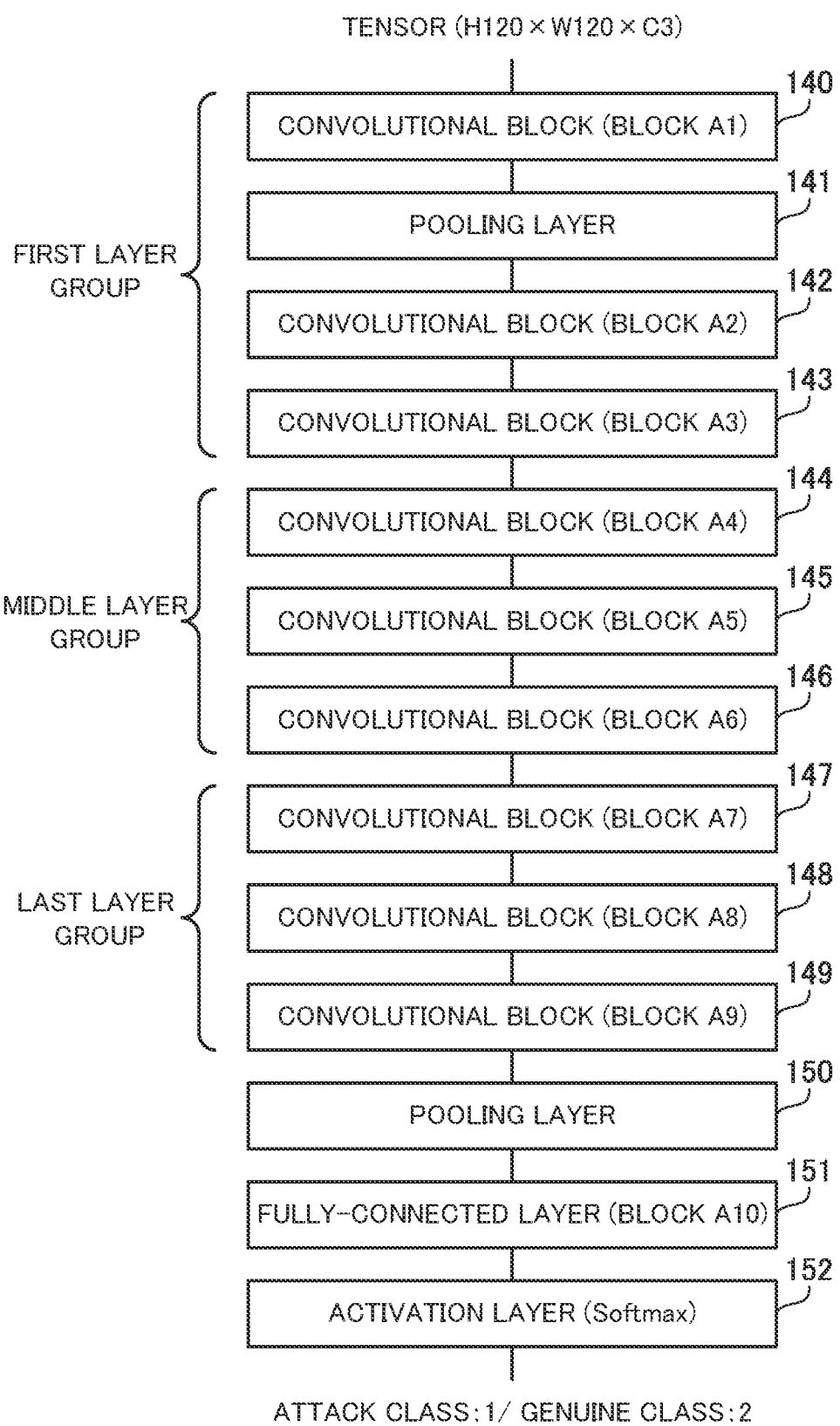
FIG. 5 illustrates an example of structure of a first convolutional neural network.

FIG. 5 illustrates an example of structure of a first convolutional neural network.

As described earlier, the machine learning unit 124 gen-erates a three-dimensional convolutional neural network, and then generates another three-dimensional convolutional neural network with transfer learning. As seen in FIG. 5, the former, i.e., the first three-dimensional convolutional neural network includes a convolutional block 140, a pooling layer 141, convolutional blocks 142 to 149, a pooling layer 150, a fully-connected layer 151, and an activation layer 152 in order from the input side.

The convolutional block 140 receives a tensor of H120× W120×C3. The convolutional blocks 140 and 142 to 149 each perform a convolution operation of applying a kernel to a tensor input thereto, to generate another tensor. The internal structures of the convolutional blocks 140 and 142 to 149 will be described later. The convolutional blocks 140 and 142 to 149 have a stride of one, for example. The stride is a shift amount indicating how much a kernel is slid over a tensor at a time. Note that the convolutional blocks 140 and 142 to 149 with a stride of one do not change the height and width of a tensor.

The pooling layers 141 and 150 each perform pooling that combines a plurality of adjacent elements in a tensor into a single element. Therefore, the pooling layers 141 and 150 each reduce the height and width of a tensor. For example, the pooling layers 141 and 150 each combine the elements of a small region of size 3×3 or 5×5 into a single element. For example, the pooling is maximum pooling that selects an element with the maximum value from a small region or average pooling that computes the average value of the plurality of elements included in a small region.

The fully-connected layer 151 uses all elements output from the pooling layer 150 to calculate two values respec-tively corresponding to two classes. The two classes are an attack class indicating that an input is a presentation attack and a genuine class indicating that an input is not a presen-tation attack. The activation layer 152 converts each of the two values output from the fully-connected layer 151 to a value ranging from 0 to 1, using a softmax function as an activation function. These two values each indicate the probability of the corresponding class. The three-dimen-sional convolutional neural network outputs a class corre-sponding to the greater one of the two values as a determi-nation result.

The three-dimensional convolutional neural network includes ten blocks. The convolutional block 140 corre-sponds to a first block (A1). The convolutional blocks 142 to 149 correspond to second to ninth blocks (A2 to A9). The fully-connected layer 151 corresponds to a tenth block (A10).

On the whole, nine blocks out of the ten blocks have the following roles. The convolutional block 140, pooling layer 141, and convolutional blocks 142 and 143 belong to the first layer group. The convolutional blocks 144 to 146 belong to the middle layer group. The convolutional blocks 147 to 149 belong to the last layer group.

The first layer group is trained to have basic pattern information for extracting various basic features from a face image. The middle layer group is trained to have essential pattern information for extracting essential features of the face image from the basic features extracted by the first layer group. The last layer group is trained to have abstract pattern information for further abstracting the essential features extracted by the middle layer group and determining a class.

By increasing the number of layers in the three-dimen-sional convolutional neural network, the middle layer group placed between the first layer group and the last layer group is able to have versatile, high-quality essential pattern infor-mation. This is because the middle layer group is placed apart from both input datasets and error information indi-cating errors from teacher labels and is therefore not greatly affected by bias and noise present in the training data. The increase in the number of layers in the three-dimensional convolutional neural network, however, increases the com-putational cost of class determination.

In addition, the parameters of the last layer group may overfit to the training data during the optimization of the parameters for the middle layer group. This is because the last layer group is placed close to error information indicat-ing errors from teacher labels and is therefore greatly affected by the bias and noise present in the training data. As a result, there is a risk that the determination model may erroneously identify, as genuine, a presentation attack made using a device different from a specific imaging device used to generate presentation attack samples. In addition, there is another risk that the determination model may erroneously identify a genuine face image as a presentation attack.

To deal with this, the machine learning unit 124 does not use the three-dimensional convolutional neural network of FIG. 5 as it is as the determination model, but generates another three-dimensional convolutional neural network with transfer learning and uses it as the determination model.

Figure 6:
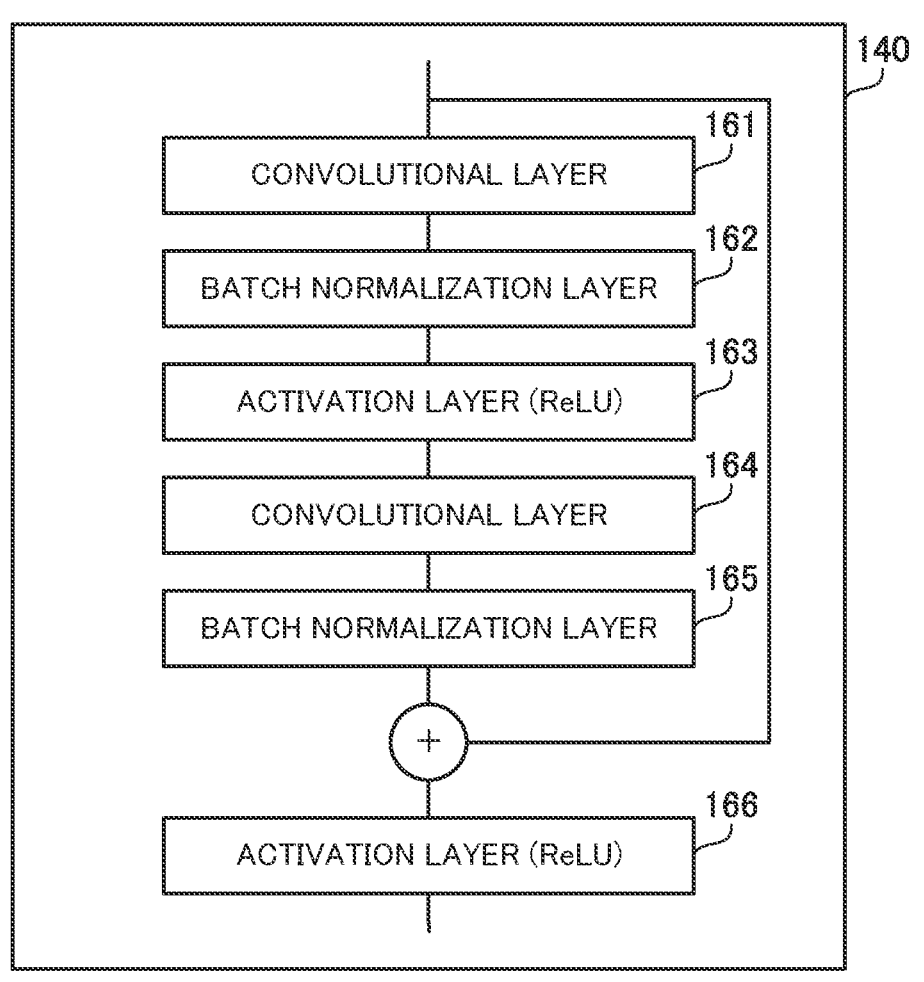
FIG. 6 illustrates an example of structure of a convolutional block.

FIG. 6 illustrates an example of structure of a convolutional block.

The convolutional block 140 includes a convolutional layer 161, a batch normalization layer 162, an activation layer 163, a convolutional layer 164, a batch normalization layer 165, and an activation layer 166 in order from the input side. The other convolutional blocks including the convolutional blocks 142 to 149 may have the same layer structure as the convolutional block 140.

The convolutional layers 161 and 164 each perform a convolution operation on a tensor input thereto to thereby generate another tensor. The batch normalization layers 162 and 165 each perform batch normalization on a tensor input thereto. The batch normalization is to normalize the distribution of elements included in each of a plurality of tensors belonging to the same mini-batch to a distribution with a mean of zero and a variance of one. The activation layers 163 and 166 each convert the values included in a tensor input thereto, using a rectified linear unit (ReLU) as an activation function. The rectified linear unit restricts all values to non-negative values by clipping negative values to zero.

The convolutional block 140 adds an output of the batch normalization layer 165 and an input of the convolutional block 140 and inputs the resulting tensor to the activation layer 166. Thereby, the parameters for a group of layers from the convolutional layer 161 to the batch normalization layer 165 are calculated such as to optimize the difference from the original input tensor. This convolutional block 140 may be called a residual neural network. In this connection, the number of convolutional layers, the number of batch normalization layers, and the number of activation layers may each be one.

Figure 7:
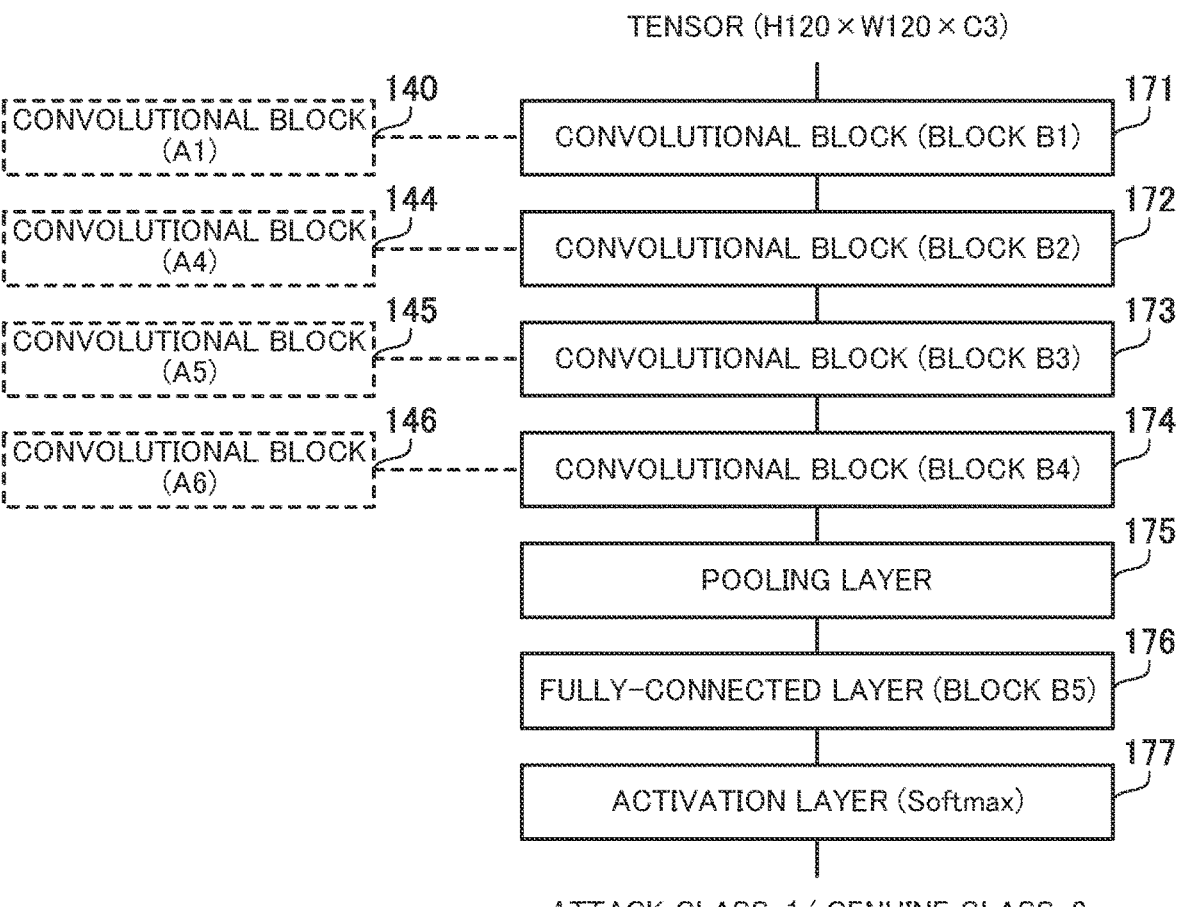
FIG. 7 illustrates an example of structure of a second convolutional neural network.

FIG. 7 illustrates an example of structure of a second convolutional neural network.

The second three-dimensional convolutional neural network that is generated by the transfer learning includes convolutional blocks 171 to 174, a pooling layer 175, a fully-connected layer 176, and an activation layer 177 in order from the input side, as illustrated in FIG. 7.

The convolutional block 171 receives a tensor of H120× W120×C3. The convolutional blocks 171 to 174 each perform a convolution operation of applying a kernel to a tensor input thereto, to generate another tensor. The pooling layer 175 performs pooling that combines a plurality of adjacent elements in a tensor into a single element.

The fully-connected layer 176 uses all elements output from the pooling layer 175 to calculate two values respectively corresponding to two classes. The activation layer 177 converts each of the two values output from the fully-connected layer 176 to a value ranging from 0 to 1, using a softmax function as an activation function. The three-dimensional convolutional neural network outputs a class corresponding to the greater one of the two values as a determination result.

The second three-dimensional convolutional neural network generated by the transfer learning includes five blocks. The convolutional block 171 corresponds to a first block (B1). The convolutional block 172 corresponds to a second block (B2). The convolutional block 173 corresponds to a third block (B3). The convolutional block 174 corresponds to a fourth block (B4). The fully-connected layer 176 corresponds to a fifth block (B5).

The convolutional block 171 corresponds to the convolutional block 140 of FIG. 5. The machine learning unit 124 copies the parameters of the convolutional block 140 as the initial values of the parameters for the convolutional block 171. Therefore, it is expected that the convolutional block 171 has basic pattern information for extracting basic features from a face image.

The machine learning unit 124, however, does not copy the parameters of the convolutional blocks 142 and 143 included in the first layer group. The omission of the pooling layer 141 and convolutional blocks 142 and 143 reduces the computational cost and thus reduces the execution time of class determination. In this connection, the second three-dimensional convolutional neural network may be generated so as to include convolutional blocks corresponding to the convolutional blocks 142 and 143.

The convolutional blocks 172 to 174 correspond to the convolutional blocks 144 to 146 of FIG. 5. The machine learning unit 124 copies the parameters of the convolutional blocks 144 to 146 as the initial values of the parameters for the convolutional blocks 172 to 174. Therefore, it is expected that the convolutional blocks 172 to 174 have essential pattern information for extracting essential features from the basic features extracted by the convolutional block 171.

Note that the input and output sizes of the convolutional blocks 172 to 174 are the same as those of the convolutional blocks 144 to 146, respectively. In addition, the input size of the convolutional block 171 is the same as that of the convolutional block 140. However, unlike the first three-dimensional convolutional neural network, there is no pooling layer between the convolutional block 171 and the convolutional block 172. Therefore, the machine learning unit 124 performs adjustment to match the output size of the convolutional block 171 with the input size of the convolutional block 172.

To this end, the machine learning unit 124 sets the stride of the convolution operation performed in the convolutional block 171 greater than that of the convolutional block 140. In the case where the stride is two, the height and width of a tensor to be output are halved, compared to the case where the stride is one. In the case where the stride is three, the height and width of a tensor to be output are one-third, compared to the case where the stride is one.

Furthermore, the machine learning unit 124 does not copy the parameters of the convolutional blocks 147 to 149 included in the last layer group. The omission of the convolutional blocks 147 to 149 reduces the computational cost and thus reduces the execution time of class determination. Additionally, the removal of parameters that have a high dependency on the training data generalizes the class determination ability and thus improves the determination accuracy.

The fully-connected layer 176 corresponds to the fully-connected layer 151 of FIG. 5. However, no parameter is copied from the fully-connected layer 151 to the fully-connected layer 176. After setting the above-described initial values in the convolutional blocks 171 to 174, the machine learning unit 124 updates the parameters of the second three-dimensional convolutional neural network using training data. The training data used in the transfer learning may be the same as or different from that used in the first machine learning.

Figure 8:
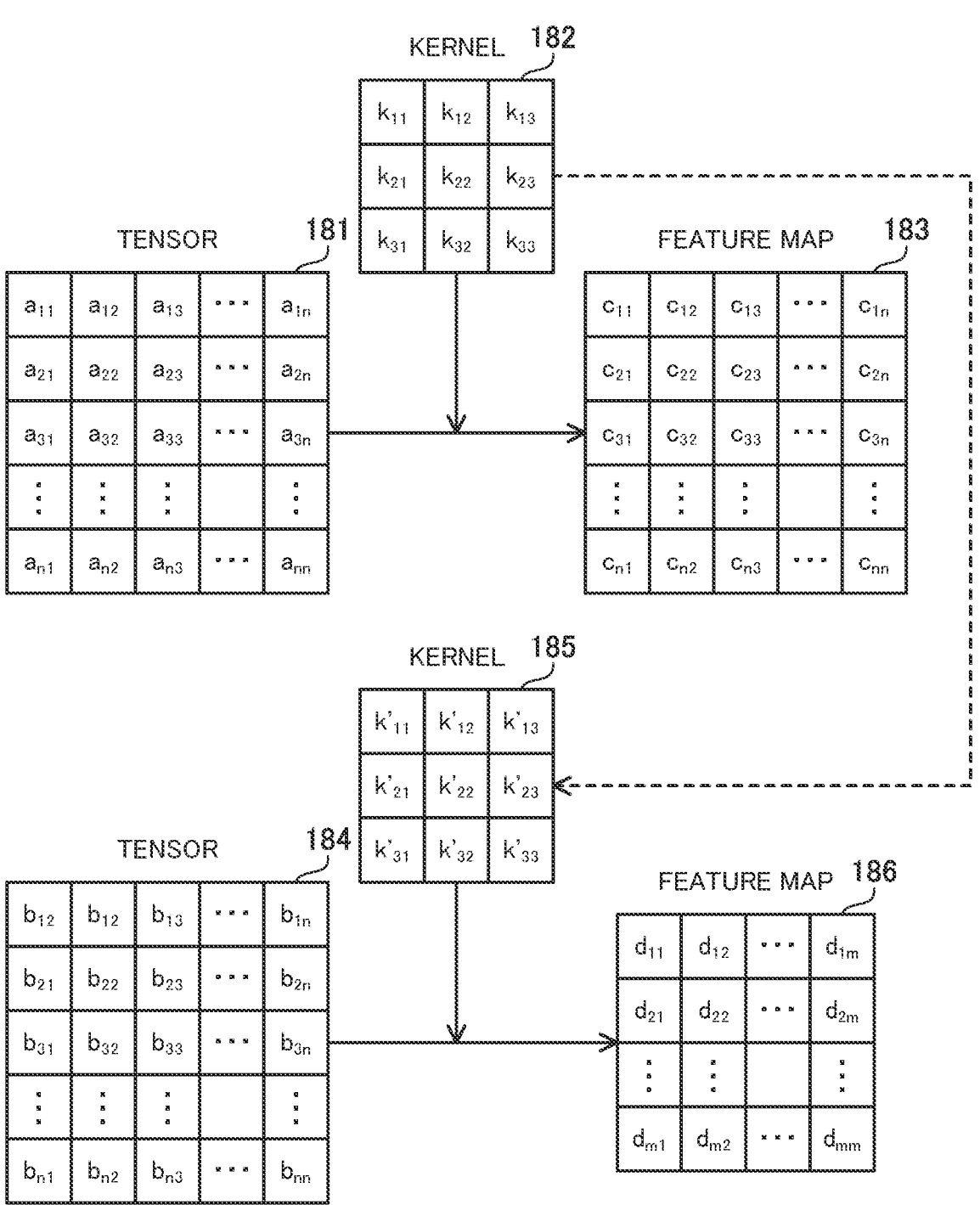
FIG. 8 illustrates an example of parameter inheritance in transfer learning.

FIG. 8 illustrates an example of parameter inheritance in transfer learning.

The convolutional block 140 receives a tensor 181. For example, the tensor 181 has a size of 120 in height and 120 in width. In addition, the convolutional block 140 has a kernel 182, which defines a set of weights for edges of the neural network. For example, the kernel 182 has a size of 3 in height and 3 in width or a size of 5 in height and 5 in width. The machine learning unit 124 calculates the coefficients of the kernel 182 through machine learning. The convolutional block 140 performs a multiply-add operation while sliding the kernel 182 over the tensor 181, to thereby generate a feature map 183. For example, the stride of this convolution operation is one. The feature map 183 has, for example, a size of 120 in height and 120 in width.

For example, the convolutional block 140 performs multiplication and addition between $a_{11}$, $a_{13}$, $a_{21}$, $a_{22}$, $a_{23}$, $a_{31}$, $a_{32}$, and $a_{33}$ of the tensor 181 and $k_{11}$, $k_{12}$, $k_{13}$, $k_{21}$, $k_{22}$, $k_{23}$, $k_{31}$, $k_{32}$, and $k_{33}$ of the kernel 182 to thereby calculate a value $c_{11}$ of the feature map 183. In addition, the convolutional block 140 performs multiplication and addition between $a_{12}$, $a_{13}$, $a_{14}$, $a_{22}$, $a_{23}$, $a_{24}$, $a_{32}$, $a_{33}$, and $a_{34}$ of the tensor 181 and $k_{11}$, $k_{12}$, $k_{23}$, $k_{22}$, $k_{22}$, $k_{23}$, $k_{31}$, $k_{32}$, and $k_{33}$ of the kernel 182 to thereby calculate a value $c_{12}$ of the feature map 183.

The convolutional block 171 receives a tensor 184. The tensor 184 has the same size as the tensor 181. In addition, the convolutional block 171 has a kernel 185. The kernel 185 has the same size as the kernel 182. The machine learning unit 124 performs transfer learning by copying the kernel 182 to the kernel 185, thereby updating the kernel 185. The convolutional block 171 generates a feature map 186 from the tensor 184 and the kernel 185. For example, the stride of this convolution operation is two or three. The feature map 186 has, for example, a size of 60 in height and 60 in width or a size of 40 in height and 40 in width.

For example, the convolutional block 171 performs multiplication and addition between $b_{11}$, $b_{12}$, $b_{13}$, $b_{21}$, $b_{22}$, $b_{23}$, $b_{31}$, $b_{32}$, and $b_{33}$ of the tensor 184 and $k'_{11}$, $k'_{12}$, $k'_{13}$, $k'_{21}$, $k'_{22}$, $k'_{23}$, $k'_{31}$, $k'_{32}$, and $k'_{33}$ of the kernel 185 to thereby calculate a value $d_{11}$ of the feature map 186. In addition, the convolutional block 171 performs multiplication and addition between $b_{13}$, $b_{14}$, $b_{15}$, $b_{23}$, $b_{24}$, $b_{25}$, $b_{33}$, $b_{34}$, and $b_{35}$ of the tensor 184 and $k'_{11}$, $k'_{12}$, $k'_{13}$, $k'_{21}$, $k'_{22}$, $k'_{23}$, $k'_{31}$, $k'_{32}$, and $k'_{33}$ of the kernel 185 to thereby calculate a value $d_{12}$ of the feature map 186. The shift amount of the kernel 185 is different from that of the kernel 182.

The following describes the processing of the information processing apparatus 100.

Figure 9:
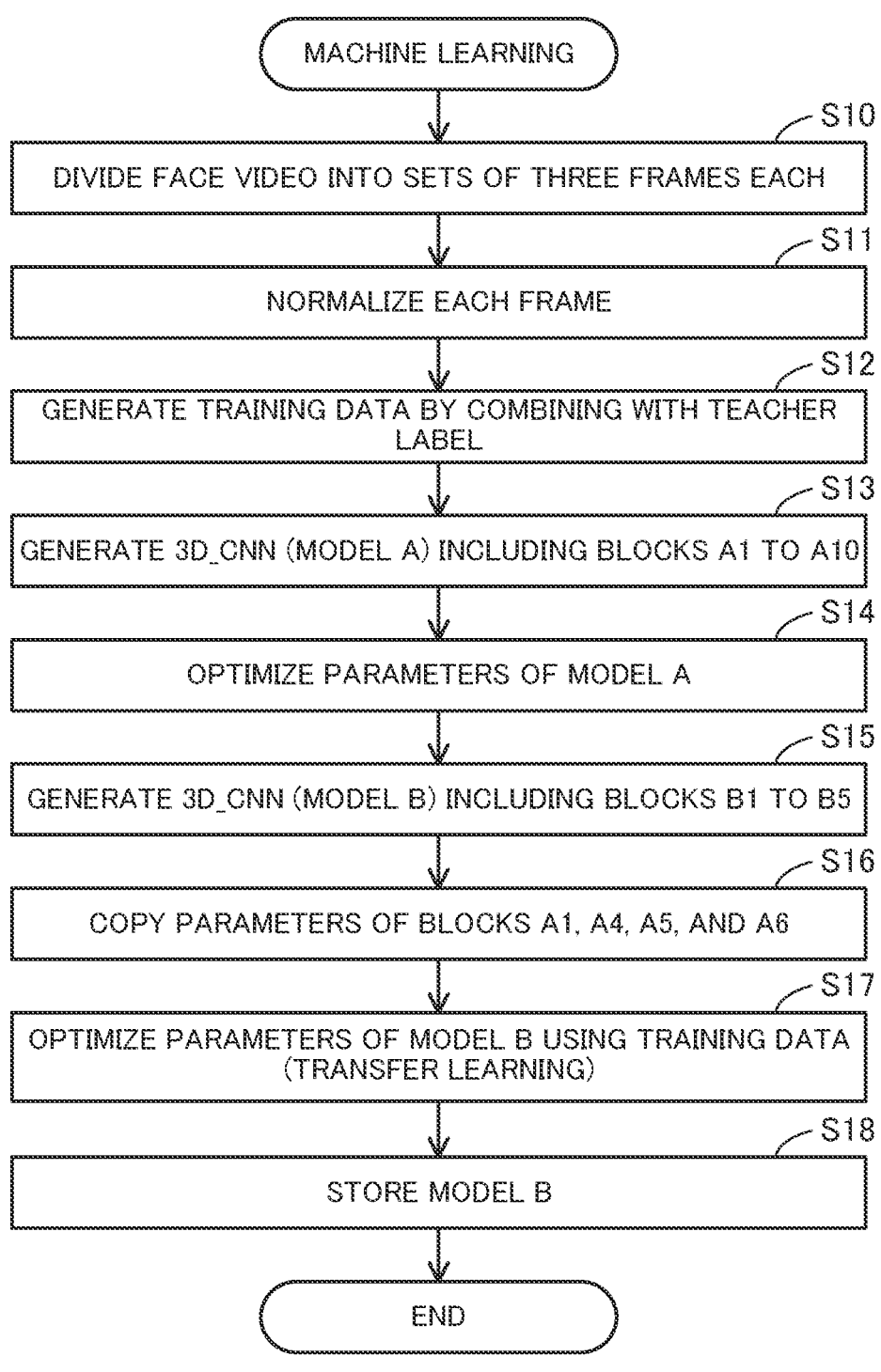
FIG. 9 is a flowchart illustrating an example of how to perform machine learning.

FIG. 9 is a flowchart illustrating an example of how to perform machine learning.

In step S10, the training data generation unit 123 divides a face video into sets of three frames each.

In step S11, the training data generation unit 123 normalizes each frame. The frame normalization includes extracting a face region, resizing, and normalizing pixel values.

In step S12, the training data generation unit 123 combines each input dataset of three consecutive frames with the teacher label given to the video to thereby generate training data including a plurality of records.

In step S13, the machine learning unit 124 generates a three-dimensional convolutional neural network (model A) including blocks A1 to A10.

In step S14, the machine learning unit 124 optimizes the parameters of the model A with machine learning using at least one of the records included in the training data generated in step S12.

In step S15, the machine learning unit 124 generates a three-dimensional convolutional neural network (model B) including blocks B1 to B5, besides the model A.

In step S16, the machine learning unit 124 copies the parameters of the blocks A1, A4, A5, and A6 of the model A as the initial values of parameters for the blocks B1 to B4 of the model B.

In step S17, the machine learning unit 124 optimizes the parameters of the model B with machine learning using at least one of the records included in the training data generated in step S12. This machine learning is transfer learning that starts with the parameters copied in step S16.

In step S18, the machine learning unit 124 stores the generated model B as a determination model.

Figure 10:
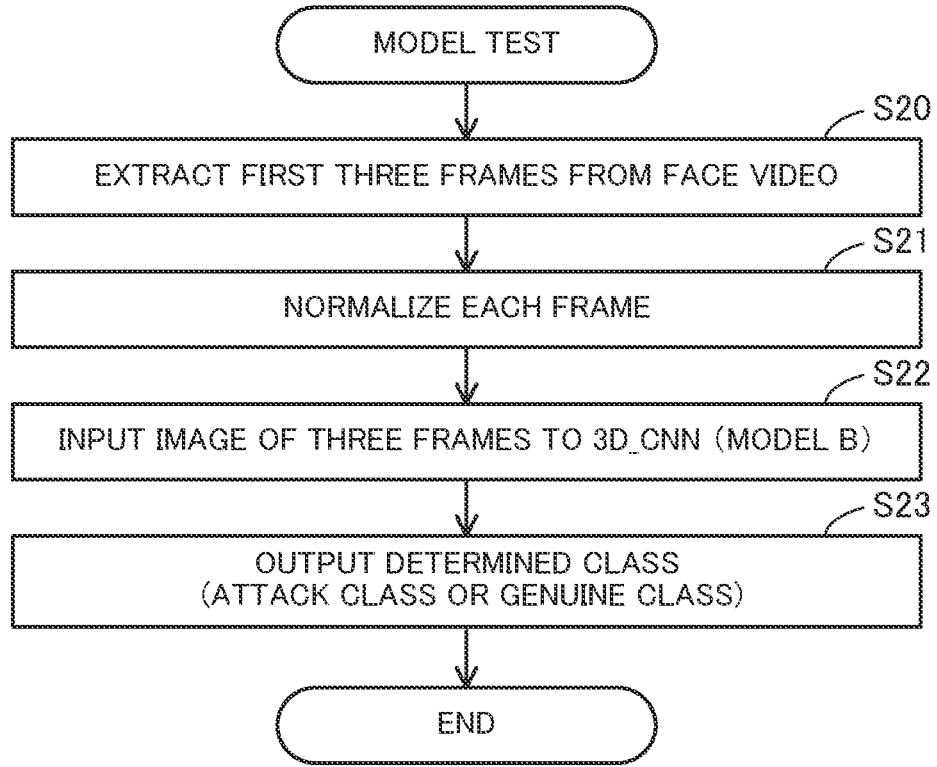
FIG. 10 is a flowchart illustrating an example of how to conduct a model test.

FIG. 10 is a flowchart illustrating an example of how to conduct a model test.

In step S20, the test data generation unit 125 extracts the first three frames of a face video.

In step S21, the test data generation unit 125 normalizes each frame. The frame normalization includes extracting a face region, resizing, and normalizing pixel values.

In step S22, the attack detection unit 126 retrieves a three-dimensional convolutional neural network that is a determination model. The attack detection unit 126 inputs an input dataset including a face image of three frames extracted in step S20 to the determination model.

In step S23, the attack detection unit 126 outputs information on a class determined by the determination model. The class may be either an attack class indicating that the face image is a counterfeit for a presentation attack or a genuine class indicating that the face image is genuine. The attack detection unit 126 may store the information on the determined class in a non-volatile storage device, may display it on the display device 111, or may send it to another information processing apparatus.

As described above, the information processing apparatus 100 of the second embodiment generates, through machine learning, a determination model of determining the presence or absence of a presentation attack from a received face image. This improves the determination accuracy and enhances the security of the biometric authentication system. In addition, the determination model is able to flexibly deal with various presentation attack methods and various electronic devices.

Furthermore, the information processing apparatus 100 generates a neural network with many layers, and then performs transfer learning by copying the parameters of at least one layer to generate a neural network with fewer layers. This reduces the size of a final determination model, reduces the computational cost to determine the presence or absence of a presentation attack, and also reduces the execution time. In addition, in the neural network with many layers, essential pattern information for extracting the essential features of a face image tends to be contained. Therefore, the final determination model is able to benefit from the advantage of multilayer structure through the transfer learning, which improves the determination accuracy.

In addition, the information processing apparatus 100 removes the last layer group from the original neural network during the transfer learning. The parameters of the last layer group may have a high dependency on training data. Such removal reduces the dependency on the training data, which improves the determination accuracy even in the case where presentation attack methods different from the training data and electronic devices different from those used for the training data are used. On the other hand, the information processing apparatus 100 copies the parameters from the middle layer group of the original neural network during the transfer learning. In the middle layer group, versatile essential pattern information with a low dependency on the training data tends to be contained. As a result, the determination accuracy of the determination model is improved.

In addition, the information processing apparatus 100 copies the parameters of the first block in the first layer group included in the original neural network during the transfer learning. In the first block in the first layer group, basic pattern information that is particularly important for extracting basic features from a face image tends to be contained. As a result, the determination accuracy of the determination model is improved. On the other hand, the information processing apparatus 100 removes the other blocks in the first layer group during the transfer learning. This reduces the size of the final determination model, reduces the computational cost to determine the presence or absence of a presentation attack, and also reduces the execution time.

Furthermore, the additional machine learning of updating the parameters of the neural network with fewer layers after the parameter copying improves the determination accuracy. In addition, the use of input datasets each containing a plurality of frames in chronological order enables the determination model to detect presentation attacks with high accuracy, taking into account temporal changes such as natural movements, changes in reflected light, environmental changes, and others. Moreover, a video is divided into sets of three frames each and these sets are used as training data, which ensures a sufficient amount of diverse training data. Furthermore, the use of the first three frames of a video as test data makes it possible to appropriately evaluate the accuracy of the determination model, simulating the actual operation of the biometric authentication.

According to one aspect, a computational cost of determination is reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A generation method comprising:
calculating, by a processor, a parameter for each of a plurality of layers included in a first neural network through first machine learning using a plurality of image datasets each containing a human biometric image, the plurality of layers including a first layer and a second layer; and
generating, by the processor, a determination model of determining authenticity of a human biometric image included in a received image dataset, by setting a parameter calculated for the first layer of the first neural network in the first layer included in a second neural network that includes the first layer and does not include the second layer.

2. The generation method according to claim 1, wherein the generating of the determination model includes performing second machine learning of updating the second neural network using the set parameter as an initial value, and
the determination model is the updated second neural network.

3. The generation method according to claim 1, wherein the second layer is placed after the first layer.

4. The generation method according to claim 1, wherein the plurality of layers include
a plurality of first layers including the first layer,
a plurality of second layers including the second layer and being placed after the plurality of first layers, and
a plurality of third layers placed before the plurality of first layers, and
the second neural network includes the plurality of first layers and does not include the plurality of second layers among the plurality of layers.

5. The generation method according to claim 4, wherein the second neural network includes at least one third layer among the plurality of third layers and does not include remaining third layers other than the at least one third layer.

6. The generation method according to claim 1, wherein the plurality of image datasets used in the first machine learning are generated by dividing first video data containing a plurality of frames into sets of a predetermined number of frames each, and
the received image dataset that the determination model receives is generated by extracting a predetermined number of frames from beginning of second video data.

7. An information processing apparatus comprising:
a memory that stores a plurality of image datasets each containing a human biometric image; and
a processor coupled to the memory and the processor configured to
calculate a parameter for each of a plurality of layers included in a first neural network through first machine learning using the plurality of image datasets, the plurality of layers including a first layer and a second layer, and
generate a determination model of determining authenticity of a human biometric image included in a received image dataset, by setting a parameter calculated for a first layer of the first neural network in the first layer included in a second neural network that includes the first layer and does not include the second layer.

8. A non-transitory computer-readable storage medium storing a computer program that causes a computer to perform a process comprising:
calculating a parameter for each of a plurality of layers included in a first neural network through first machine learning using a plurality of image datasets each containing a human biometric image, the plurality of layers including a first layer and a second layer; and
generating a determination model of determining authenticity of a human biometric image included in a received image dataset, by setting a parameter calculated for the first layer of the first neural network in the first layer included in a second neural network that includes the first layer and does not include the second layer.

* * * * *